US007579387B2

(12) United States Patent  
Jackson et al.

(10) Patent No.: US 7,579,387 B2
(45) Date of Patent: Aug. 25, 2009

(54) RADIATION-CROSSLINKED POLYOLEFIN COMPOSITIONS

(75) Inventors: Peter Jackson, Toronto (CA); Marcus P. Heydrich, Mississauga (CA); Karen Schnuelle, Cambridge (CA)

(73) Assignee: ShawCor Ltd., Toronto, Ontario (CA)

(*) Notice: Subject to any disclaimer, the term of this patent is extended or adjusted under 35 U.S.C. 154(b) by 0 days.

(21) Appl. No.: 12/134,838

(22) Filed: Jun. 6, 2008

(65) Prior Publication Data

US 2008/0242758 A1 Oct. 2, 2008

Related U.S. Application Data

(63) Continuation of application No. 11/048,833, filed on Feb. 2, 2005, now Pat. No. 7,456,231.

(51) Int. Cl.
*C08F 2/46* (2006.01)
*C08J 3/28* (2006.01)

(52) U.S. Cl. ............... 522/112; 522/109; 522/110; 522/111; 522/71; 522/74; 522/150; 522/157; 522/158; 522/161; 522/184; 522/186; 522/189; 522/906; 525/211; 525/221; 525/227; 525/222; 525/240; 525/70; 525/198; 525/195; 525/191; 525/197; 264/234; 264/232; 264/236; 264/17; 264/237; 264/18

(58) Field of Classification Search ............... 522/109, 522/110, 112, 150, 157, 158, 159, 161, 184, 522/186, 189, 111, 71, 74, 906; 525/211, 525/221, 227, 222, 240, 70, 198, 195, 191, 525/197; 264/232, 234, 236, 237, 17, 18

See application file for complete search history.

(56) References Cited

U.S. PATENT DOCUMENTS

| 3,294,869 A | 12/1966 | Robinson |
| 3,646,155 A | 2/1972 | Scott |
| 3,717,559 A | 2/1973 | Oyama et al. |
| 3,971,882 A | 7/1976 | Alia |
| 4,069,190 A | 1/1978 | Vostovich |
| 4,277,578 A | 7/1981 | Yoshimura et al. |
| 4,291,136 A | 9/1981 | Keogh |
| 4,302,557 A | 11/1981 | Yoshimura et al. |
| 4,336,212 A | 6/1982 | Yoshimura et al. |
| 4,343,917 A | 8/1982 | Keogh |
| 4,397,981 A | 8/1983 | Doi et al. |
| 4,424,293 A | 1/1984 | Nojiri et al. |
| 4,520,260 A | 5/1985 | Kotian et al. |
| 4,628,073 A | 12/1986 | Fisher |
| 4,808,665 A | 2/1989 | Patel et al. |
| 4,874,665 A | 10/1989 | Doheny |
| 4,916,198 A | 4/1990 | Scheve et al. |
| 4,961,797 A | 10/1990 | Doheny |
| 4,961,978 A | 10/1990 | Doheny, Jr. et al. |
| 5,022,941 A | 6/1991 | Doheny, Jr. et al. |
| 5,047,446 A | 9/1991 | DeNicola, Jr., et al. |
| 5,063,005 A | 11/1991 | Doheny, Jr. |
| 5,158,815 A | 10/1992 | Doheny, Jr. |
| 5,211,746 A | 5/1993 | Keogh et al. |
| 5,262,467 A | 11/1993 | Keough et al. |
| 5,266,607 A | 11/1993 | Lucas et al. |
| 5,272,236 A | 12/1993 | Lai et al. |
| 5,368,919 A | 11/1994 | Robeson |
| 5,414,027 A | 5/1995 | DeNicola, Jr. et al. |
| 5,439,949 A | 8/1995 | Lucas et al. |
| 5,508,318 A | 4/1996 | Comer |
| 5,541,236 A | 7/1996 | DeNicola, Jr. et al. |
| 5,552,104 A | 9/1996 | DeNicola, Jr. et al. |
| 5,554,668 A | 9/1996 | Scheve et al. |
| 5,562,958 A | 10/1996 | Walton et al. |
| 5,820,981 A | 10/1998 | Williams et al. |
| 5,852,152 A | 12/1998 | Walton et al. |
| 6,107,574 A | 8/2000 | Chang et al. |

(Continued)

FOREIGN PATENT DOCUMENTS

JP 51-132260 11/1976

(Continued)

OTHER PUBLICATIONS

European Search Report issued in corresponding European Patent Application No. 05 11 12 32.

(Continued)

*Primary Examiner*—Sanza L McClendon

(57) ABSTRACT

An article suitable for use as an insulating or coating material comprises a radiation-crosslinked composition comprising a polyethylene, a polypropylene and optionally an ethylene-propylene elastomer. The polyethylene component is selected from high density polyethylene (HDPE), medium density polyethylene (MDPE) and linear medium density polyethylene (LMDPE) and the polypropylene component is either a homopolymer or copolymer. The composition is predominantly based on the polyethylene component and contains the polyethylene component in an amount of at least 50 percent by weight. The article is radiation-crosslinked to a sufficient degree that it possesses thermoset properties, such that when the article is heated to a temperature above the crystalline melting point of the polypropylene homopolymer or copolymer, it is softened but does not become liquid. The article is formed by first blending the polyethylene, polypropylene and optionally the ethylene-propylene elastomer, melt processing the blend to produce an article, crosslinking the article by exposing it to radiation, and optionally heating, stretching and cooling the article to impart heat shrinkability to the article.

41 Claims, No Drawings

U.S. PATENT DOCUMENTS

| | | | |
|---|---|---|---|
| 6,197,864 | B1 | 3/2001 | Borke et al. |
| 6,350,828 | B1 | 2/2002 | Takaoka et al. |
| 6,369,176 | B1 | 4/2002 | Laughner et al. |
| 6,380,294 | B1 | 4/2002 | Babinec et al. |
| 6,455,637 | B1 | 9/2002 | Jackson et al. |
| 6,455,771 | B1 | 9/2002 | Han et al. |
| 6,465,547 | B1 | 10/2002 | Jackson et al. |
| 6,525,119 | B2 | 2/2003 | Tsukada et al. |
| 6,569,915 | B1 | 5/2003 | Jackson et al. |
| 6,794,453 | B2 | 9/2004 | Jackson et al. |
| 7,361,384 | B2 | 4/2008 | Mamish |
| 7,456,231 | B2 | 11/2008 | Jackson et al. |
| 2006/0173089 | A1 | 8/2006 | Jackson et al. |
| 2006/0255501 | A1 | 11/2006 | Jackson et al. |
| 2008/0057313 | A1 | 3/2008 | Bicakci-Jenkins et al. |
| 2008/0057315 | A1 | 3/2008 | Alaerts et al. |

FOREIGN PATENT DOCUMENTS

| | | |
|---|---|---|
| JP | 53-039341 | 4/1978 |
| JP | 53-065347 | 6/1978 |
| JP | 55-045716 | 3/1980 |
| JP | 56-083748 | 7/1981 |
| JP | 57-008203 | 1/1982 |
| JP | 57-172911 | 10/1982 |
| JP | 57-209912 | 12/1982 |
| JP | 58-038710 | 3/1983 |
| JP | 58-129016 | 8/1983 |
| JP | 60-118709 | 6/1985 |
| JP | 60-124613 | 7/1985 |
| JP | 60-144315 | 7/1985 |
| JP | 02-099548 | 4/1990 |
| JP | 03-157438 | 7/1991 |
| JP | 03-233809 | 10/1991 |
| JP | 03-297637 | 12/1991 |
| JP | 04-025546 | 1/1992 |
| JP | 04-306515 | 10/1992 |
| JP | 05-005016 | 1/1993 |
| JP | 05-163399 | 6/1993 |
| JP | 05-198215 | 8/1993 |
| JP | 06-012923 | 1/1994 |
| JP | 06-052726 | 2/1994 |
| JP | 06-168629 | 6/1994 |
| JP | 06-200101 | 7/1994 |
| JP | 07-006634 | 1/1995 |
| JP | 08-176375 | 7/1996 |
| JP | 2002-080671 | 3/2002 |
| WO | WO 95/34597 A1 | 12/1995 |
| WO | WO 00/69930 A1 | 11/2000 |
| WO | WO 02/32983 A1 | 4/2002 |
| WO | WO 2006/076704 A2 | 7/2006 |
| WO | WO 2008/027064 A1 | 3/2008 |

OTHER PUBLICATIONS

Polyethylene, printed from Wikipedia Online Encyclopedia, http://en.wikipedia.org/wiki/Polyethylene, Jan. 5, 2008, pp. 1-5.

Notice of Allowance issued in U.S. Appl. No. 11/048,833 (now U.S. Patent No. 7,456,231) dated Aug. 20, 2008.

Office Action issued in U.S. Appl. No. 11/048,833 (now U.S. Patent No. 7,456,231) dated May 15, 2008.

Office Action issued in U.S. Appl. No. 11/048,833 (now U.S. Patent No. 7,456,231) dated Jul. 20, 2007.

Office Action issued in U.S. Appl. No. 11/048,833 (now U.S. Patent No. 7,456,231) dated Feb. 7, 2007.

Office Action issued in U.S. Appl. No. 11/126,540 dated Mar. 19, 2009.

Office Action issued in U.S. Appl. No. 11/126,540 dated Sep. 23, 2008.

U.S. Appl. No. 12/399,565, filed Mar. 6, 2009.

RADIATION-CROSSLINKED POLYOLEFIN COMPOSITIONS

REFERENCE TO PRIOR APPLICATIONS

This application is a continuation of application Ser. No. 11/048,833 filed Feb. 2, 2005 now U.S. Pat. No. 7,456,231.

FIELD OF THE INVENTION

The present invention relates to polymer compositions and their uses, and more particularly to radiation-crosslinked compositions of medium, linear medium or high density polyethylene and polypropylene, and to coatings and insulating materials containing these compositions.

BACKGROUND OF THE INVENTION

Polypropylenes are ideally suited to the preparation of coatings and insulating materials designed for use at operating temperatures in excess of those that can be withstood by other polyolefins such as, for example, polyethylene, which exhibits lower softening and melting temperatures. Polyethylenes have a maximum melting point, as measured by differential scanning calorimetry (DSC), of about 135° C., whereas polypropylenes can have melting points as high as 175° C. As such, polypropylenes can withstand higher operating temperatures without being permanently damaged or deformed.

Other attractive features of polypropylenes are their high rigidity, abrasion resistance, impact resistance, toughness, low cost and relatively low density. Applications for polypropylene-based coatings and insulations include insulation for electrical wires and cables, heat-shrinkable, corrosion protective sleeves for high-temperature transmission pipeline joints, heat-shrinkable tubing or shapes for electrical insulation and mechanical protection, or other applications requiring greater toughness and rigidity than is afforded by polyethylene-based systems.

In order to maximize heat resistance and physical properties, it is necessary to impart some thermoset characteristic to the material. This is done by crosslinking the polymer to some required degree. This renders the material resistant to melting and flowing when it is heated to a temperature close to or above the crystalline melting point of the highest melting point polymer component of the composition. This characteristic is necessary for the production of high temperature insulation materials and heat-shrinkable articles. In the latter case crosslinking imparts controlled shrinkage characteristics and renders the material resistant to melting when it is heated to the temperature necessary to effect shrinkage.

Several examples of crosslinked, predominantly polypropylene-based polymer compositions are known in the prior art. U.S. Pat. No. 6,569,915, which is incorporated herein by reference in its entirety, describes heat-shrinkable articles which comprise a radiation-crosslinked composition based predominantly on polypropylene and also comprising an ethylene-propylene elastomer. U.S. Pat. Nos. 6,455,637, 6,465, 547 and 6,794,453, incorporated herein by reference in their entirety, relate to articles comprised of moisture-crosslinked, predominantly polypropylene based compositions which also include amounts of silane-grafted polyolefin. The predominantly polypropylene-based compositions disclosed and claimed in these patents all have high rigidity, toughness and heat deformation resistance, making them suitable for use in demanding applications such as protective sleeves for high-temperature transmission pipelines where the operating temperature is typically in the range of 110-130° C., or above.

There are, however, situations where it is desirable to provide compositions and articles having rigidity, toughness and mechanical integrity similar to that of crosslinked polypropylene-based compositions, but with moderated high-temperature capability as determined by those mechanical properties dependent upon the performance of the constituent polymers above their softening points. However, these compositions should provide similar long-term thermal stability with respect to useful service life at the intended operating temperature. In addition, there is a need for compositions which economically meet these requirements and offer improved manufacturing processibility.

SUMMARY OF THE INVENTION

The present invention overcomes the above-mentioned deficiencies of the prior art by providing articles comprising a radiation-crosslinked composition predominantly based on medium, linear medium or high density polyethylene and also containing lesser amounts of a polypropylene homopolymer or copolymer. The inventors have found that compositions according to the invention have rigidity and toughness similar to that of the predominantly polypropylene-based compositions described above, without the need for polypropylene as the predominant ingredient. In addition, these compositions offer enhanced extrusion processibility in terms of manufacturing throughput and control.

The articles and compositions of the invention are suitable for use in applications which demand a lesser degree of heat resistance than is typically the case for compositions comprising predominantly polypropylene. More specifically, the articles and compositions according to the invention are suitable for use at operating temperatures less than the softening point of the medium, linear medium or high density polyethylene component or where mechanical deformation due to softening above this temperature is not a limiting factor. Examples include radiation-crosslinked, heat-shrinkable sleeves for the mechanical and corrosion protection of pipeline joints at temperatures up to 110° C.; radiation-crosslinked, heat-shrinkable tubing products for the mechanical protection, strain relief and insulation of electrical and electronic splices, connections and terminations; and radiation-crosslinked electrical insulation for wire and cable where high temperature toughness, rigidity and long-term thermal stability (to 150° C.) are important requirements.

In one aspect, the present invention provides a radiation-crosslinked article comprised of a polymer composition. The polymer composition comprises: (a) at least 50 percent by weight of a polyethylene selected from the group comprising high density polyethylene (HDPE), medium density polyethylene (MDPE) and linear medium density polyethylene (LMDPE); and (b) from about 5 percent by weight to less than 50 percent by weight of a polypropylene selected from the group comprising polypropylene homopolymer and polypropylene copolymers. The article is crosslinked by exposure to radiation and possesses a sufficient degree of crosslinking such that when the article is heated to a temperature above the crystalline melting point of the polypropylene, it is softened but does not become liquid.

According to another aspect, the present invention provides a process for producing a radiation-crosslinked, thermoset article. The process comprises the following steps: (a) forming a blend comprising at least 50 percent by weight of a polyethylene selected from the group comprising HDPE, MDPE and LMDPE, and from about 5 percent by weight to less than 50 percent by weight of a polypropylene selected from the group comprising polypropylene homopolymer and polypropylene copolymers; (b) melt processing the blend to produce a melt-processed article having a first set of dimensions; and (c) crosslinking the melt-processed article by exposure to radiation to thereby produce the radiation-crosslinked, thermoset article. The dosage of radiation is sufficient to impart thermoset characteristics to the article, such that when the article is heated to a temperature above the crystalline melting point of the polypropylene, it is softened but does not become liquid.

DETAILED DESCRIPTION OF PREFERRED EMBODIMENTS

As mentioned above, the composition according to the invention is comprised predominantly of a high density polyethylene (HDPE), medium density polyethylene (MDPE), or linear medium density polyethylene (LMDPE), referred to herein as "the polyethylene". The use of the term "predominantly" herein with reference to the compositions according to the invention is intended to mean at least 50 percent by weight. Accordingly, the composition according to the invention comprises at least 50 percent by weight of the polyethylene. Preferably, the polyethylene is contained in the composition in an amount from above 50 percent to about 90 percent, and more preferably from about 55 to 80 percent.

The terms HDPE and MDPE as used herein are defined in accordance with American Society for Testing and Materials (ASTM) Standard D 1248. By definition, MDPE has a density ranging from 0.926 to 0.940 g/cm$^3$ and HDPE has a density of at least 0.941 g/cm$^3$. The density of LMDPE falls within the same density range as MDPE. By way of contrast, low density polyethylene (LDPE) is defined by ASTM Standard D 1248 to have a density from 0.910 to 0.925 g/cm$^3$. Also, LDPE has a crystalline melting point no higher than 115° C.

The polyethylene used in the present invention preferably has a density of about 0.93 to 0.97 g/cm$^3$, a melt flow index of about 0.1 to 10 dg/min and a crystalline melting point of at least about 120° C. The polyethylene includes both ethylene homopolymers and copolymers of ethylene with higher alpha olefins such as butene, hexene and octene, and is of a predominantly linear molecular structure. The polyethylene may preferably be manufactured using metallocene catalysts, also known as single-site, stereo-specific or constrained geometry catalysts, and may also comprise a bimodal molecular weight distribution. In some cases, the inventors have found that these materials provide the necessary crosslinking sensitivity for the compositions according to the invention without the need for additional crosslinking promoters.

The composition according to the invention also comprises a polypropylene which is selected from one or more members of the group comprising polypropylene homopolymers and copolymers of propylene with an olefin other than propylene. Preferred polypropylene copolymers are copolymers of propylene and ethylene. Additionally, the polypropylene component may preferably be modified with reactive functional groups, such as silanes, acrylic acids, methacrylic acids, acrylates, methacrylates, glycidyl methacrylates, and anhydrides. Where the polypropylene is a copolymer, it contains at least about 80 percent by weight propylene.

The polypropylene component is present in the composition in an amount of greater than about 5 percent and less than 50 percent by weight. Preferably, the polypropylene content of the composition is from about 5 to 40 percent by weight, and more preferably from about 10 to 30 percent by weight.

The polypropylene is preferably isotactic in nature, having a density of about 0.85 to 0.91 g/cm$^3$ and a melt flow index of about 0.1 to 10 dg/min. Preferably, the polypropylene has a melt viscosity, as measured by the melt flow index, which is similar to that of the HDPE component at the same temperature and under the same shear conditions required for processing the blend, to ensure optimum blend compatibility. The crystalline melting point of the polypropylene is usually in the range of about 160-170° C., with about 165° C. being typical.

The composition according to the invention optionally comprises one or more ethylene-propylene elastomers selected from the class of materials known as ethylene-propylene copolymers or elastomers (EPM), more preferably from those known as ethylene-propylene diene terpolymers or elastomers (EPDM), and most preferably from those ethylene-propylene diene terpolymers or elastomers polymerized using single-site or metallocene catalysts (mEPDM), or blends thereof. The ethylene-propylene elastomer component is preferably selected to have a melt viscosity as close as possible to the polypropylene and the polyethylene components at the same temperature and under the same shear conditions required for processing the blend. The ethylene-propylene elastomer component preferably has a density of about 0.85 to 0.92 g/cm$^3$ and a Mooney Viscosity (ML 1 +4 at 125° C.), which is indicative of melt viscosity, of about 5 to 50.

Preferably, the ethylene-propylene elastomer comprises about 40 to 95% by weight ethylene, more preferably about 70 to 95% by weight ethylene, even more preferably about 75 to 95% by weight ethylene, and most preferably about 85 to 95% by weight ethylene. The ethylene-propylene-diene terpolymers additionally comprise about 0.5 to 10% by weight diene monomer usually chosen from 5-ethylidene-2-norbornene, dicyclopentadiene, or 1,4-hexadiene, and preferably 5-ethylidene-2-norbornene.

The most preferred mEPDM terpolymers are prepared by copolymerizing propylene with ethylene and one or more of the diene monomers listed above using a highly stereo-specific, single-site, constrained geometry, or so-called metallocene catalyst. These preferred mEPDM materials differ from EPDM materials produced using standard Ziegler-Natta coordination catalysts in that it is possible to more accurately control the quantity and position of the comonomers within the polymer structure to provide a more precise molecular weight distribution and a more regular molecular architecture, resulting in higher crystallinity, for example, and superior material properties. More importantly with respect to the present invention, it is possible to adjust the comonomer levels for optimum sensitivity of the mEPDM materials to crosslinking by electron beam irradiation. In some cases, the inventors have found that these materials provide the necessary crosslinking sensitivity for the compositions according to the invention without the need for additional crosslinking promoters.

The content of ethylene-propylene elastomer in the composition according to the invention is up to about 40%, more preferably up to about 30%, even more preferably from about 5 to 20% by weight of the composition.

The composition may further comprise one or more optional ingredients selected from the group comprising radiation sensitizers (also known as crosslinking promoters), compatibilizers, pigments, antioxidant stabilizers, heat stabilizers, ultra-violet (UV) stabilizers, mineral fillers, halogenated flame retardants, process aids and the like.

The optional compatibilizer may be selected from the group comprising: any of the polyethylenes and polypropylenes described above; one or more members of the group comprising ethylene-propylene copolymers; ethylene-propylene diene elastomers; crystalline propylene-ethylene elastomers; thermoplastic polyolefin elastomers; metallocene polyolefins; cyclic olefin copolymers; polyoctenamers; copolymers of ethylene with vinyl acetate, vinyl alcohol, and/or alkyl acrylates; polybutenes; hydrogenated and non-hydrogenated polybutadienes; butyl rubber; polyolefins modified with reactive functional groups selected from the group comprising silanes, alcohols, amines, acrylic acids, methacrylic acids, acrylates, methacrylates, glycidyl methacrylates, and anhydrides; polyolefin ionomers; polyolefin nanocomposites; and block copolymers selected from the group comprising styrene-butadiene, styrene-butadiene-styrene, styrene-ethylene/propylene and styrene-ethylene/butylene-styrene.

In any given composition according to the invention, the compatibilizer is different from the polyethylene, polypropylene and ethylene-propylene elastomer components of that particular composition. Furthermore, where the compatibilizer comprises a polyethylene, polypropylene or an ethylene-propylene elastomer as defined above, the amount of compatibilizer present in the composition is such that the total amounts of the polyethylene, polypropylene and ethylene-propylene elastomer in the composition fall within the ranges described above for these components.

The compatibilizer is preferably added to the composition in an amount of up to about 25 percent by weight, more preferably up to about 15 percent, and even more preferably from about 5 to about 10 percent by weight of the composition, such that the composition remains predominantly polyethylene-based. The function of the compatibilizer is primarily to promote miscibility of the polypropylene and the polyethylene components when they are blended together, such that the blend exhibits homogeneous behaviour during use. Addition of the compatibilizer may not be required where the other components of the composition exhibit satisfactory natural miscibility or performance.

The radiation sensitizer is preferably selected from the family of multifunctional monomers typically used as crosslink promoters for polyolefin-based polymers. Preferred monomers include trimethylol propane triacrylate, trimethylol propane trimethacrylate, tetramethylol tetraacrylate, ethylene glycol dimethacrylate, triallyl cyanurate and triallyl isocyanurate. The radiation sensitizer is preferably added in an amount of about 0.25 to 2.5%, more preferably 0.5 to 1.5% by weight of the blend. The function of the radiation sensitizer is to render the polymer composition more susceptible to crosslinking by electron beam (beta) radiation or gamma radiation, hence allowing a given level of crosslinking to be achieved with less radiation dosage and energy than if a sensitizer were not used. Addition of the crosslinking promoter is unnecessary where the composition is sufficiently sensitive to irradiation to achieve the required degree of crosslinking.

The antioxidant stabilizer may be chosen from any suitable antioxidant or blend of antioxidants designed to prevent degradation of the composition during melt processing and subsequent heat aging of the final product. Examples of suitable antioxidants and heat stabilizers include those classes of chemicals known as hindered phenols, hindered amines, phosphites, bisphenols, benzimidazoles, phenylenediamines, and, dihydroquinolines. These are preferably added in an amount of about 0.1 to 5% by weight of the blend, depending upon the aging properties required and the type and quantity of optional destabilizing ingredients in the composition, for example halogenated flame retardants or mineral fillers. It should also be noted that these antioxidants and stabilizers, if added in excessive amounts, may become "radiation scavengers", acting to reduce the effectiveness of the radiation to induce the desired crosslinking reaction and the resultant degree of crosslinking obtainable for a given radiation dosage.

The composition according to the invention is formed by blending the polyethylene and the polypropylene, along with any of the optional components described above. Blending of the components can either be performed as a separate step prior to melt processing of the finished article, or may be performed simultaneously with melt processing of the finished article.

When performed as a separate prior step, the components are preferably melt-blended by a machine specifically designed for that purpose, such as a continuous single-screw or twin-screw extrusion compounder, kneader, or internal batch mixer. The blended composition may then be pelletized and stored for subsequent melt processing into the desired finished article.

Melt processing of the composition may preferably be performed by techniques commonly used in the industry such as extrusion or molding. Examples of extruded articles include sheet, tubing and electrical insulation. In some preferred embodiments, the composition may be co-extruded or laminated with another material of similar or dissimilar composition to form a laminate structure having discrete but intimately bonded layers, with each layer having different functional properties. For example, an adhesive-coated polymer sheet can be produced by co-extruding or laminating the composition with an adhesive. In other examples, the composition may be laminated with a less expensive or non-crosslinkable layer. Molded articles can be produced by injection, compression or blow molding and examples include electrical insulating articles such as end caps and break-out boots.

Once formed, the article is crosslinked by irradiation, preferably with electron beam, gamma or UV radiation. Crosslinking is the formation of permanent covalent bonds between individual polymer chains which act to bind the polymer chains together and prevent them from irreversibly separating during subsequent heating. It is this crosslinked structure which, while retaining the elastomeric nature of the material, renders the material thermoset and resistant to melting which, in turn, is a desirable property for producing heat-shrinkable articles, as discussed below. Crosslinking also provides the article with high heat resistance, allowing it to maintain mechanical toughness and integrity at high service temperatures.

Preferably, the article is irradiated by electron beam radiation at a dosage from about 1 to 20 megarads in an electron beam accelerator, for example a "Dynamitron" manufactured by Radiation Dynamics Inc. The desired dosage is dependent upon the desired properties of the article. Too low a dosage will result in the article having a low degree of crosslinking, poor mechanical toughness and a tendency to prematurely soften or melt at elevated temperatures. Too high a dosage may result in degradation of the polypropylene component with a resultant unacceptable deterioration in mechanical properties. A preferred dosage has been found to be between 5 and 10 megarads for the manufacture of heat-shrinkable articles according to the invention. Higher dosages may be more suitable for wire and cable insulation applications.

The dosage of radiation is sufficient to provide the article with a level of crosslinking, as measured by the gel fraction, of about 20 to 90 percent. Preferably, the gel fraction of the crosslinked article is from about 30 to 70 percent and more preferably from about 40 to 70 percent.

As mentioned above, articles produced according to the invention can be rendered heat-shrinkable since they exhibit the property of not melting when heated to a temperature close to or above the crystalline melting point of the highest melting point component, which is usually the polypropylene. This is important because the crosslinked structure allows the article to be stretched with minimal force and without melting, and to retain its mechanical integrity when heated to this temperature. The article is fixed in this stretched state by rapidly cooling it below the crystalline melting point while holding the article in its stretched position, the reformed rigid crystalline regions of the polymeric components of the material preventing the article from spontaneously recovering to its original dimensions. Stretching of the article can be accomplished by mechanical, pneumatic or hydraulic means. Cooling the article in its stretched state may be accomplished by a cooling medium such as air, water or other heat-transfer medium.

Subsequent re-heating of the stretched article above the melting point of the highest melting point component will cause the crystalline regions to re-melt and the structure to elastomerically recover to its original unstretched dimensions. The crosslinked structure provides the initial recovery force and again ensures that the article does not melt and that it maintains its mechanical integrity.

The invention is further illustrated by the following examples:

EXAMPLE 1

An isotactic polypropylene copolymer of density 0.90 g/cm$^3$ and melt flow index 0.45 dg/min (Profax 7823 from Basell Polyolefins), a HDPE of density 0.947 g/cm$^3$ and melt flow index 0.28 dg/min (Finathene CD4300 from Atofina), and a metallocene-catalyzed ethylene propylene diene terpolymer of density 0.908 g/cm$^3$ and melt flow index 1.0 dg/min (Nordel IP 4820P from DuPont Dow Elastomers) were melt blended with an antioxidant masterbatch of 15% hindered phenol and phosphite stabilizers in polyethylene (Irganox B225 from Ciba Speciality Chemicals) and a pigment masterbatch of 25% carbon black in polypropylene in the amounts shown in Table 1 using a Buss Kneader, reciprocating screw, continuous extrusion compounder at a temperature of around 180° C., the dispersed blend then being fed through a hot die-face pelletizer and dryer attachment.

The compounded pellets thus produced were fed through a 24:1 L/D single-screw extruder equipped with a single layer sheet die, and extruded into sheet at a melt temperature of approximately 220° C. The sheet was fixed to the required dimensions of width, thickness and orientation by passing it through a cooled, 3-roll calendering stack.

The extruded sheet was then crosslinked at a dosage of approximately 5 megarads using a Radiation Dynamics "Dynamitron" electron beam accelerator, and was then tested to determine the degree of crosslinking achieved and for the mechanical properties indicated in Table 2.

The crosslinked sheet was then re-heated to a temperature of approximately 150° C., and then stretched by approximately 50% using a machine-direction (MDO) mechanical stretcher. Whilst in the stretched state, the sheet was rapidly cooled by feeding it between water-cooled steel rollers to below the crystalline melting point of the composition to fix the sheet at the stretched dimensions. The sheet was subsequently extrusion laminated with a layer of hot melt adhesive.

EXAMPLE 2

In this example, the process of Example 1 was repeated except that the relative amounts of HDPE, polypropylene and terpolymer were varied as shown in Table 1.

EXAMPLES 3, 4 AND 5

In these examples, the effect of alternate HDPE components was examined. In Example 3, the HDPE was of density 0.960 g/cm$^3$ and melt flow index 4.9 dg/min (Sclair 2907 from Nova Chemicals). In Example 4, a metallocene-catalyzed HDPE of density 0.935 g/cm$^3$ and melt flow index 0.9 dg/min (Finacene BM359SG from Atofina) was used. Example 5 contained the Finathene CD4300 used in Examples 1 and 2, above. The ratio of polypropylene to HDPE was kept constant in all cases.

The Examples were prepared by blending the components indicated in Table 1 using a laboratory internal mixer set at a temperature of approximately 200° C. The mixed compositions were then pressed into plaques of approximate thickness 0.060 in. and subsequently crosslinked as described in Example 1.

The crosslinked plaques were then tested for the degree of crosslinking achieved and for the mechanical properties indicated in Table 2.

EXAMPLE 6

A crosslinked heat-shrinkable tubing product was prepared by extruding the composition in Example 1 at a melt temperature of 220° C. into a tubular cross-section, irradiating the extruded tube at a dosage of about 5 megarads, heating the thereby crosslinked tube to 190° C., stretching the tube to twice its original internal diameter using internally applied compressed air, then finally spraying the stretched tube with cold water to freeze the tube in its stretched state.

EXAMPLE 7

A crosslinked insulated wire was prepared by extruding the composition in Example 5 at a melt temperature of 240° C. over a 14 AWG size wire, then irradiating said wire at a dosage of 12 megarad.

TABLE 1

| | Compositions | | | | |
|---|---|---|---|---|---|
| Ingredient | Example 1 | Example 2 | Example 3 | Example 4 | Example 5 |
| HDPE (Finathene CD4300) | 60 | 80 | — | — | 70 |
| HDPE (Sclair 2907) | — | — | 70 | — | — |
| HDPE (Finacene BM359SG) | — | — | — | 70 | — |
| Polypropylene (Profax 7823) | 30 | 15 | 30 | 30 | 30 |
| EPDM (Nordel IP 4820P) | 10 | 5 | — | — | — |
| Antioxidant Masterbatch* | 12 | 12 | 7.5 | 7.5 | 7.5 |
| Pigment Masterbatch** | 0.5 | 0.5 | 0.5 | 0.5 | 0.5 |

*15% masterbatch in polyethylene
**25% masterbatch in polypropylene

TABLE 2

| Property | Ex. 1 | Ex. 2 | Ex. 3 | Ex. 4 | Ex. 5 |
|---|---|---|---|---|---|
| Process Conditions and Properties | | | | | |
| Dosage (Mrad) | 5 | 5 | 8 | 8 | 8 |
| Gel Fraction (%) | 50 | 70 | 40 | 45 | 45 |
| Hot Tensile Strength @ 200° C. and 100% Elongation (psi) | 12 | 13 | 3.5 | 5.5 | 13.5 |
| Ultimate Hot Elongation @ 200° C. (%) | >450 | 400 | >450 | >450 | >450 |
| Ultimate Tensile Strength @ 23° C. (psi) | 4300 | 3100 | 2900 | 2900 | 3000 |
| Ultimate Elongation @ 23° C. (%) | 600 | 550 | 13 | 180 | 10 |
| Flexural Modulus @ 23° C. (psi) | 63,000 | 56,000 | 65,000 | 55,000 | 62,000 |

Although the invention has been described in relation to certain preferred embodiments, it will be appreciated that it is not intended to be limited thereto. Rather, the invention is intended to encompass all embodiments which fall within the scope of the following claims.

What is claimed is:

1. A radiation-crosslinked article comprised of a polymer composition, the polymer composition comprising:
   (a) a polyethylene; and
   (b) from about 5 to 40 percent by weight of a polypropylene selected from the group consisting of polypropylene homopolymer and polypropylene copolymers;
   (c) from about 5 to about 25 percent by weight of a compatibilizer;
   wherein the compatibilizer comprises a copolymer of ethylene with a higher alpha olefin and is different from said polyethylene;
   wherein the amount of said compatibilizer present in the composition is such that the combined amount of said polyethylene and said compatibilizer is at least 60 percent by weight of the composition; and
   wherein the article is crosslinked by exposure to radiation and possesses a sufficient degree of crosslinking such that when the article is heated to a temperature above the crystalline melting point of the polypropylene, it is softened but does not become liquid.

2. The radiation-crosslinked article according to claim 1, wherein the higher alpha olefin in said copolymer of ethylene is selected from the group consisting of butene, hexene and octene, and is of a predominantly linear molecular structure.

3. The radiation-crosslinked article according to claim 1, wherein the polyethylene is polymerized using a metallocene catalyst.

4. The radiation-crosslinked article according to claim 3, wherein the metallocene catalyst comprises a single-site, stereospecific, constrained geometry metallocene catalyst.

5. The radiation-crosslinked article according to claim 1, wherein the amount of the polypropylene in the composition is from about 10 to 30 percent by weight.

6. The radiation-crosslinked article according to claim 1, wherein the amount of the polypropylene in the composition is from about 30 to 40 percent by weight.

7. The radiation-crosslinked article according to claim 1, wherein the polyethylene is selected from the group consisting of high density polyethylene, medium density polyethylene and linear medium density polyethylene.

8. The radiation-crosslinked article according to claim 1, wherein the combined amount of said polyethylene and said compatibilizer is from about 60 to 80 percent by weight of the composition.

9. The radiation-crosslinked article according to claim 1, further comprising one or more additional ingredients selected from the group consisting of radiation sensitizers, pigments, antioxidant stabilizers, heat stabilizers, ultra-violet stabilizers, mineral fillers, halogenated flame retardants and process aids.

10. The radiation-crosslinked article according to claim 1, wherein the compatibilizer comprises an ethylene-propylene elastomer.

11. The radiation-crosslinked article according to claim 10, wherein the ethylene-propylene elastomer comprises an ethylene-propylene-diene terpolymer.

12. The radiation-crosslinked article according to claim 11, wherein the ethylene-propylene-diene terpolymer is polymerized using a metallocene catalyst.

13. The radiation-crosslinked article according to claim 12, wherein the metallocene catalyst comprises a highly stereospecific, single-site, constrained geometry metallocene catalyst.

14. The radiation-crosslinked article according to claim 11, wherein the ethylene-propylene-diene terpolymer is prepared by copolymerizing propylene with ethylene and a diene monomer selected from the group consisting of 5-ethylidene-2-norbornene, dicyclopentadiene and 1,4-hexadiene.

15. The radiation-crosslinked article according to claim 11, wherein the ethylene-propylene-diene terpolymer comprises from about 40 to about 95 percent by weight ethylene and from about 0.5 to about 10 percent by weight diene monomer.

16. The radiation-crosslinked article according to claim 10, wherein the ethylene-propylene elastomer comprises from about 70 to about 95 percent by weight ethylene.

17. The radiation-crosslinked article according to claim 1, wherein the article has a gel fraction of from about 20 to 90 percent.

18. The radiation-crosslinked article according to claim 1, wherein the article has a gel fraction of from about 40 to 70 percent.

19. A process for producing a radiation-crosslinked article comprised of a polymer composition, wherein the process comprises the following steps:
   (a) forming a blend comprising a polyethylene and a polypropylene, wherein the polyethylene is selected from the group consisting of high density polyethylene, medium density polyethylene and linear medium density polyethylene and the polypropylene is selected from the group consisting of polypropylene homopolymer and polypropylene copolymers, wherein the polyethylene comprises at least 60 percent by weight of the blend;

(b) blending the polyethylene and the polypropylene with an ethylene-propylene elastomer in an amount of up to about 40 percent by weight of the composition;

(c) melt processing the polyethylene, the polypropylene and the ethylene-propylene elastomer to produce a melt-processed article having a first set of dimensions; and (d) crosslinking the melt-processed article by exposure to radiation to thereby produce said radiation-crosslinked article, wherein a dosage of said radiation is sufficient to impart thermoset characteristics to the article such that, when the article is heated to a temperature above the crystalline melting point of the polypropylene, it is softened but does not become liquid.

20. The process of claim 19, wherein the amount of said ethylene-propylene elastomer blended with the polyethylene and polypropylene is from about 5 percent to about 40 percent by weight of the composition.

21. The process of claim 19, wherein the amount of said ethylene-propylene elastomer blended with the polyethylene and polypropylene is from about 5 percent to about 30 percent by weight of the composition.

22. The process of claim 19, wherein the amount of said ethylene-propylene elastomer blended with the polyethylene and polypropylene is from about 5 percent to about 20 percent by weight of the composition.

23. The process of claim 19, further comprising:
(e) heating the radiation-crosslinked article to a first temperature at which it is softened but not melted, said first temperature being close to or above the crystalline melting point of the polypropylene;
(f) stretching the softened article at said first temperature such that the article is expanded beyond the first set of dimensions; and
(g) cooling the stretched article to a second temperature below the temperature at which the article is softened while holding the article in its stretched form.

24. The process of claim 19, wherein steps (a) and (b) are performed simultaneously.

25. The process of claim 19, wherein melt-mixing step (a) is performed prior to step (b) using a machine selected from the group comprising a continuous twin-screw compounder, a kneader and an internal batcher.

26. The process of claim 19, wherein melt processing step (c) comprises extruding or molding.

27. The process of claim 19, wherein crosslinking step (d) is performed in an electron beam accelerator, and wherein the radiation comprises electron beam radiation, the dosage being about 1 to 20 megarads.

28. The process of claim 27, wherein the dosage is about 5 to 10 megarads.

29. A radiation-crosslinked article comprised of a polymer composition, the polymer composition comprising:
(a) at least 60 percent by weight of a polyethylene selected from the group consisting of high density polyethylene (HDPE), medium density polyethylene (MDPE) and linear medium density polyethylene (LMDPE);
(b) from about 5 percent by weight to less than 40 percent by weight of a polypropylene selected from the group consisting of polypropylene homopolymer and polypropylene copolymers;
(c) from 0 to 20 percent by weight of an ethylene-propylene elastomer;
wherein the article is crosslinked by exposure to radiation and possesses a sufficient degree of crosslinking such that when the article is heated to a temperature above the crystalline melting point of the polypropylene, it is softened but does not become liquid; and (d) a compatibilizer comprising one or more members of the group consisting of: high density polyethylene (HDPE); medium density polyethylene (MDPE); linear medium density polyethylene (LMDPE); low density polyethylene (LDPE); polypropylene homopolymer and polypropylene copolymers optionally modified with reactive functional groups selected from the group consisting of silanes, acrylic acids, methacrylic acids, acrylates, methacrylates, glycidyl methacrylates and anhydrides; ethylene-propylene copolymers; ethylene-propylene diene elastomers; crystalline propylene-ethylene elastomers; thermoplastic polyolefin elastomers; metallocene polyolefins; cyclic olefin copolymers; polyoctenamers; copolymers of ethylene with vinyl acetate, vinyl alcohol, and/or alkyl acrylates; polybutenes; hydrogenated and non-hydrogenated polybutadienes; butyl rubber; polyolefins modified with reactive functional groups selected from the group consisting of silanes, alcohols, amines, acrylic acids, methacrylic acids, acrylates, methacrylates, glycidyl methacrylates, and anhydrides; polyolefin ionomers; polyolefin nanocomposites; and block copolymers selected from the group consisting of styrene-butadiene, styrene-butadiene-styrene, styrene-ethylene/propylene and styrene-ethylene/butylene-styrene; wherein the compatibilizer comprises from about 5 to about 10 percent of the composition.

30. A process for producing a radiation-crosslinked article, comprising:
(a) forming a blend comprising at least 60 percent by weight of a polyethylene selected from the group consisting of high density polyethylene (HDPE), medium density polyethylene (MDPE) and linear medium density polyethylene (LMDPE), from about 5 percent by weight to less than 40 percent by weight of a polypropylene selected from the group consisting of polypropylene homopolymer and polypropylene copolymers, and from 0 to 20 percent by weight of an ethylene-propylene elastomer;
(b) melt processing the blend to produce a melt-processed article having a first set of dimensions; and
(c) crosslinking the melt-processed article by exposure to radiation to thereby produce said radiation-crosslinked article, wherein a dosage of said radiation is sufficient to impart thermoset characteristics to the article, such that, when the article is heated to a temperature above the crystalline melting point of the polypropylene, it is softened but does not become liquid.

31. The process of claim 30, further comprising:
(d) heating the radiation-crosslinked article to a first temperature at which it is softened but not melted, said first temperature being close to or above the crystalline melting point of the polypropylene;
(e) stretching the softened article at said first temperature such that the article is expanded beyond the first set of dimensions; and
(f) cooling the stretched article to a second temperature below the temperature at which the article is softened while holding the article in its stretched form.

32. The process of claim 30, wherein steps (a) and (b) are performed simultaneously.

33. The process of claim 30, wherein melt-mixing step (a) is performed prior to step (b) using a machine selected from the group comprising a continuous twin-screw compounder, a kneader and an internal batcher.

34. The process of claim 30, wherein melt processing step (b) comprises extruding or molding.

35. The process of claim 30, wherein crosslinking step (c) is performed in an electron beam accelerator, and wherein the radiation comprises electron beam radiation, the dosage being about 1 to 20 megarads.

36. The process of claim 35, wherein the dosage is about 5 to 10 megarads.

37. A process for producing a radiation-crosslinked article, comprising:
(a) forming a blend comprising at least 60 percent by weight of a polyethylene selected from the group consisting of high density polyethylene (HDPE), medium density polyethylene (MDPE) and linear medium density polyethylene (LMDPE), and from about 5 percent by weight to less than 50 percent by weight of a polypropylene selected from the group consisting of polypropylene homopolymer and polypropylene copolymers;
(b) melt processing the blend to produce a melt-processed article having a first set of dimensions; and
(c) crosslinking the melt-processed article by exposure to radiation to thereby produce said radiation-crosslinked article, wherein a dosage of said radiation is sufficient to impart thermoset characteristics to the article, such that, when the article is heated to a temperature above the crystalline melting point of the polypropylene, it is softened but does not become liquid;
wherein the blend contains 0 percent by weight of an ethylene-propylene elastomer.

38. A radiation-crosslinked article comprised of a polymer composition, the polymer composition comprising:
(a) at least 50 percent by weight of a polyethylene selected from the group consisting of high density polyethylene (HDPE), medium density polyethylene (MDPE) and linear medium density polyethylene (LMDPE); and
(b) from about 5 percent by weight to less than 50 percent by weight of a polypropylene selected from the group consisting of polypropylene homopolymer and polypropylene copolymers;
wherein the article is crosslinked by exposure to radiation and possesses a sufficient degree of crosslinking such that when the article is heated to a temperature above the crystalline melting point of the polypropylene, it is softened but does not become liquid;
wherein the composition contains 0 percent by weight of an ethylene-propylene elastomer.

39. A process for producing a radiation-crosslinked article, comprising:
(a) forming a blend comprising at least 50 percent by weight of a polyethylene selected from the group consisting of high density polyethylene (HDPE), medium density polyethylene (MDPE) and linear medium density polyethylene (LMDPE), and from about 5 percent by weight to less than 50 percent by weight of a polypropylene selected from the group consisting of polypropylene homopolymer and polypropylene copolymers;
(b) melt processing the blend to produce a melt-processed article having a first set of dimensions; and
(c) crosslinking the melt-processed article by exposure to radiation to thereby produce said radiation-crosslinked article, wherein a dosage of said radiation is sufficient to impart thermoset characteristics to the article, such that, when the article is heated to a temperature above the crystalline melting point of the polypropylene, it is softened but does not become liquid;
wherein the blend contains 0 percent by weight of an ethylene-propylene elastomer.

40. A radiation-crosslinked article comprised of a polymer composition, the polymer composition comprising:
(a) above 60 percent by weight of a polyethylene selected from the group consisting of high density polyethylene (HDPE), medium density polyethylene (MDPE) and linear medium density polyethylene (LMDPE);
(b) from about 5 percent by weight to less than 40 percent by weight of a polypropylene selected from the group consisting of polypropylene homopolymer and polypropylene copolymers; and
(c) from 0 to 9 percent by weight of an ethylene-propylene elastomer;
wherein the article is crosslinked by exposure to radiation and possesses a sufficient degree of crosslinking such that when the article is heated to a temperature above the crystalline melting point of the polypropylene, it is softened but does not become liquid.

41. The radiation-crosslinked article according to claim 40, wherein the amount of the polyethylene in the composition is from about 60 to 80 percent.

* * * * *